United States Patent

[11] 3,612,248

| | | |
|---|---|---|
| [72] | Inventor | Charles W. Wallis<br>Cary, Ill. |
| [21] | Appl. No. | 846,893 |
| [22] | Filed | Aug. 1, 1969 |
| [45] | Patented | Oct. 12, 1971 |
| [73] | Assignee | American Chain & Cable Company, Inc.<br>New York, N.Y. |

[54] ACCUMULATING ROLLER CONVEYOR
8 Claims, 7 Drawing Figs.

[52] U.S. Cl. .................................... 198/37,
198/127
[51] Int. Cl. ........................................ B65g 43/08
[50] Field of Search ........................... 198/127,
34, 160, 37

[56] References Cited
UNITED STATES PATENTS

| 3,225,893 | 12/1965 | Currie | 198/127 |
|---|---|---|---|
| 3,420,355 | 1/1969 | Good | 198/127 |
| 3,425,736 | 2/1969 | Benjamin | 294/64 |
| 3,512,624 | 5/1970 | Crane | 198/37 X |

FOREIGN PATENTS

| 193,995 | 9/1967 | U.S.S.R. | 198/127 |
|---|---|---|---|

Primary Examiner—Gerald M. Forlenza
Assistant Examiner—George F. Abraham
Attorney—Barnes, Kisselle, Raisch & Choate ABSTRACT: An accumulating roller conveyor comprising a plurality of longitudinally spaced transversely extending article-carrying rollers with a belt positioned beneath the rollers. Pressure rollers are normally held in position against the belt to hold the belt against the article-supporting rollers by expansible chambers to which fluid is supplied. A fluidic switch is provided along the path of the articles and when an article is stopped in position overlying the switch, the fluidic switch functions to deflate the expansible chamber permitting the pressure rollers to move away from the belt and thereby permitting the belt to move away from the article-carrying rollers so that the rotation of the article-carrying rollers is interrupted.

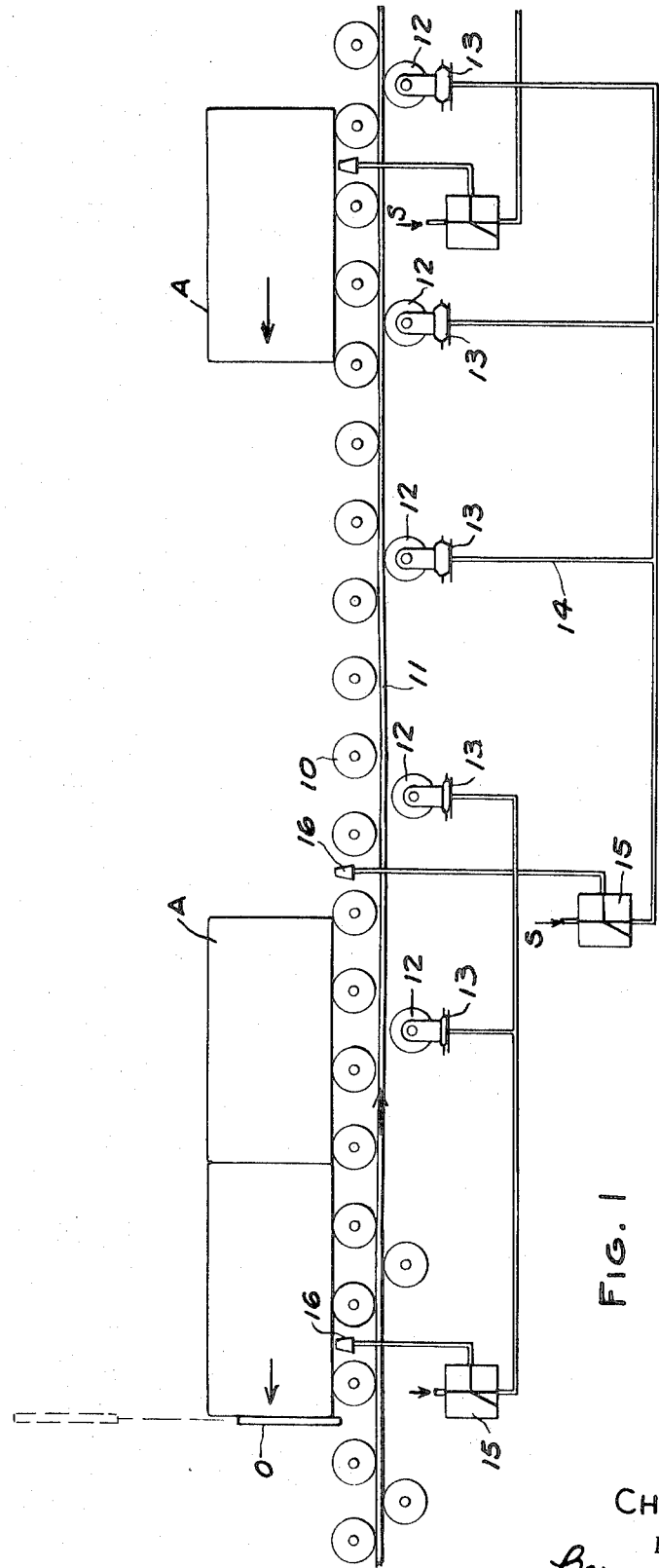
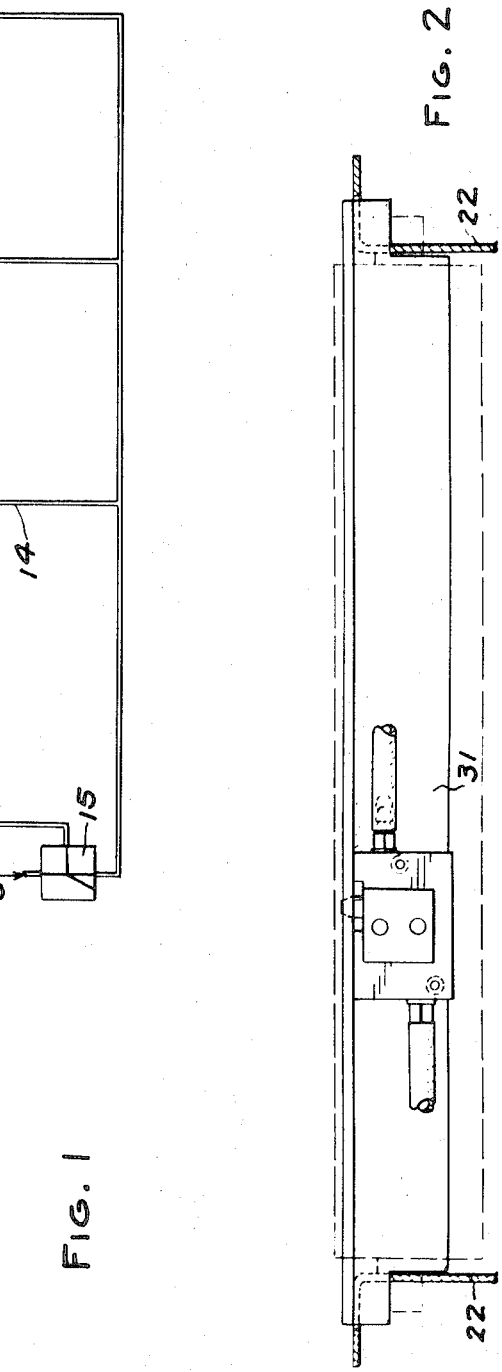

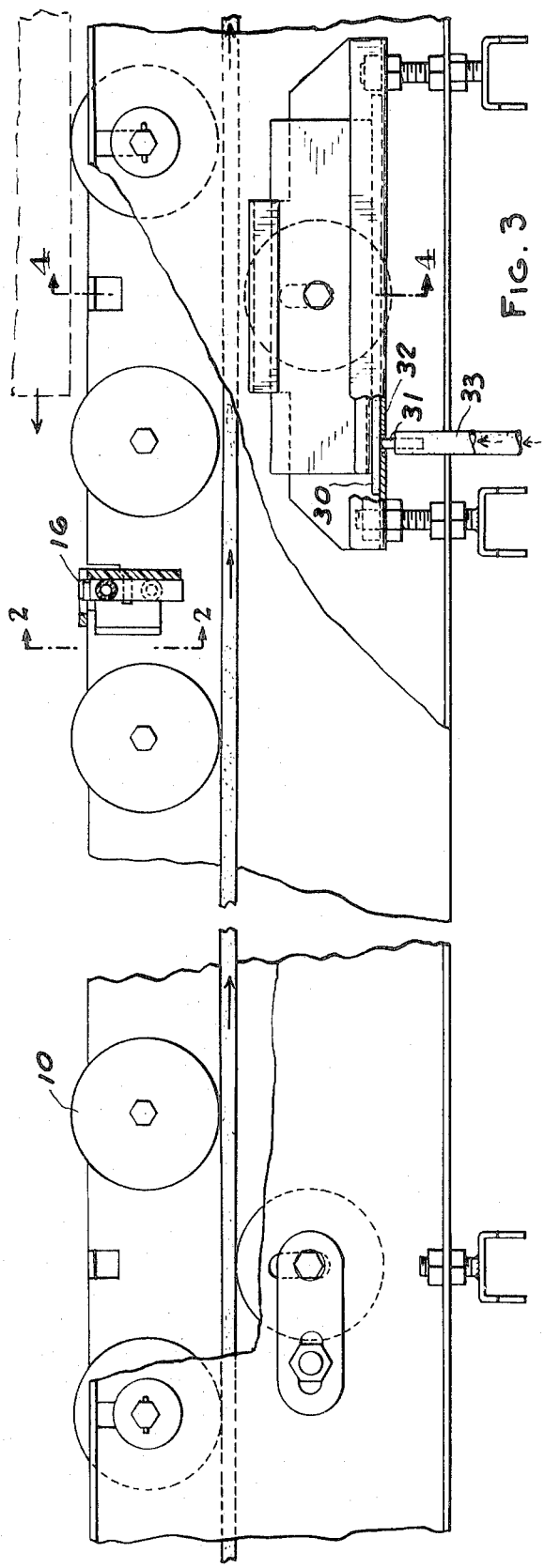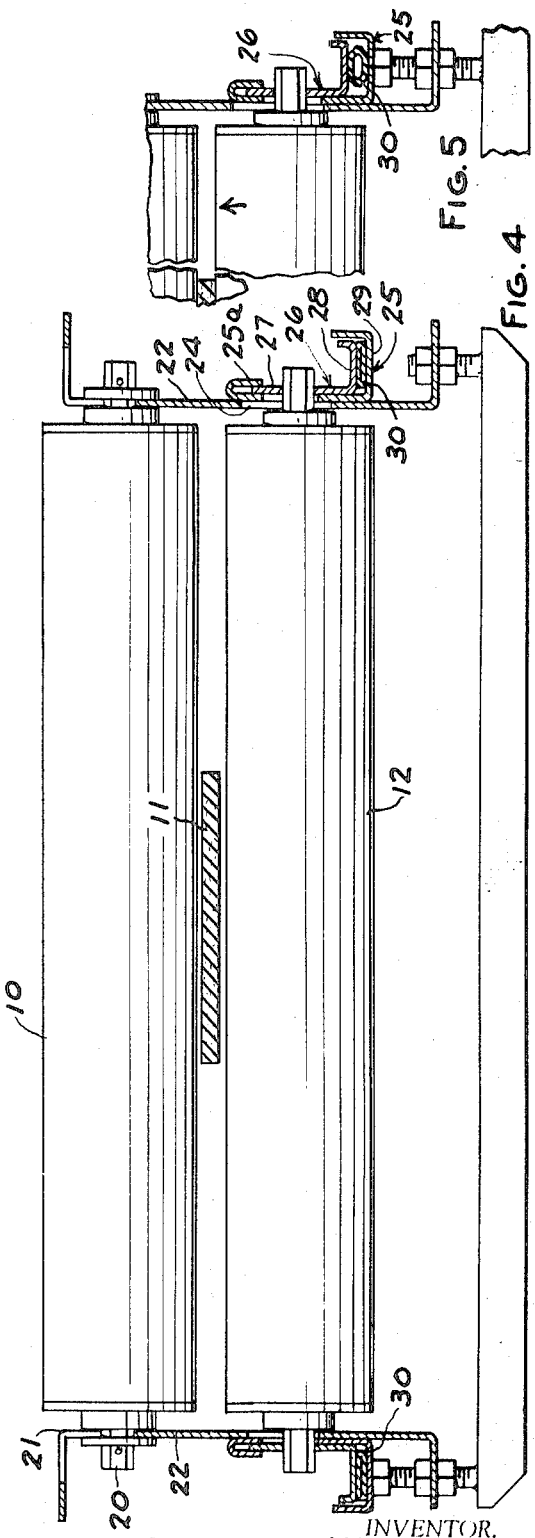

ACCUMULATING ROLLER CONVEYOR

This invention relates to accumulating roller conveyors.

In accumulating roller conveyors, it is conventional to provide article-carrying rollers for supporting the articles which rollers are driven from below by driving means such as a driver belt or other driven rollers. It has also been heretofore suggested that the driving means can be moved into and out of engagement with the article-carrying rollers in response to sensing of the interruption of movement of an article on the rollers.

Among the objects of the invention are to provide an accumulating roller conveyor of the type wherein sensing means which do not contact the articles are provided for interrupting the movement of the rollers when an article is stopped; which system is relatively simple; which system is relatively low in cost and easy to maintain.

SUMMARY OF THE INVENTION

An accumulating roller conveyor comprising a plurality of longitudinally spaced transversely extending article-carrying rollers with drive means positioned beneath the rollers. The drive means is normally held in position against the article-supporting rollers by expansible chambers to which fluid is supplied. A noncontacting sensing device is provided along the path of the articles and when an article is stopped in position overlying the device, the device functions to deflate the expansible chamber permitting the drive means to move away from the article-carrying rollers so that the rotation of the article-carrying rollers is interrupted.

DESCRIPTION OF THE DRAWINGS

FIG. 1 is a diagrammatic longitudinal view of the apparatus embodying the invention.

FIG. 2 is a fragmentary sectional view taken along the line 2—2 in FIG. 3.

FIG. 3 is a part sectional fragmentary longitudinal view of a conveyor system embodying the invention.

FIG. 4 is a fragmentary sectional view taken along the line 4—4 in FIG. 3.

FIG. 5 is a fragmentary sectional view similar to FIG. 4 of a portion of the system showing the parts in a different operating position.

DESCRIPTION

Figure 6:
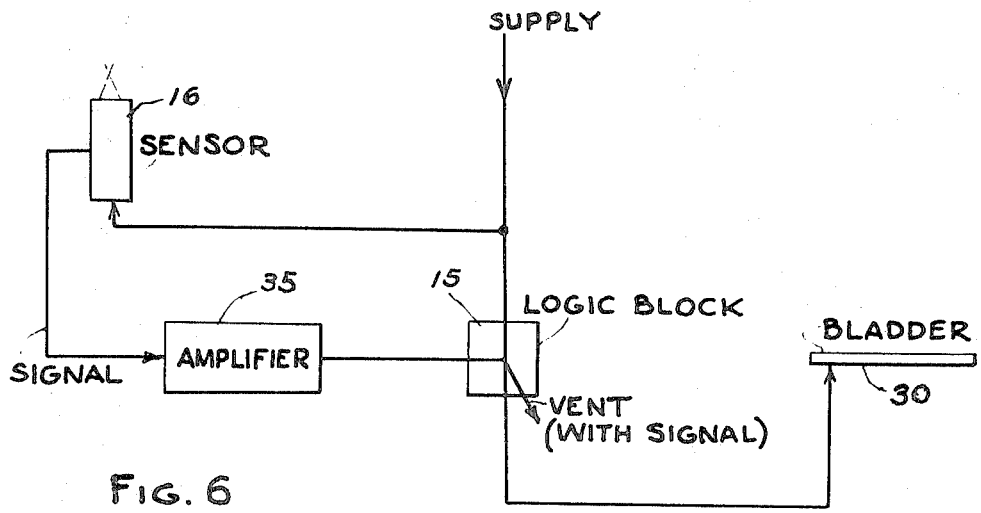
FIG. 6 is a schematic diagram of one type of control system.

Referring to FIG. 1 which is a diagrammatic view of the system, the system comprises a plurality of longitudinally spaced transversely extending article-carrying rollers 10 which are adapted to support articles A and move them along in the direction of the arrow when the rollers 10 are rotated. An endless drive belt 11 is provided beneath the rollers 10 and is adapted to be selectively held in position by pressure rollers 12 for driving the rollers 10.

One or more pressure rollers 12 is held in roller-driving position by an inflatable expansible chamber 13, such as a bladder, which is supplied with fluid such as air from a line 14. Control of fluid to the chambers 13 is by a fluidic switch 15 which controls the flow from a source S. As shown, one fluidic switch 15 is provided for a plurality of chambers 13 and associated rollers 12.

A sensing device 16 of the noncontacting type, herein shown as being a nozzle, is provided between rollers 10 at longitudinally spaced points for directing a jet of air upwardly from the fluidic switch 15 into the path of the articles A.

In the event that an article A is interrupted in its movement in overlying relationship to a nozzle 16, the resultant restriction of the flow out of the nozzle functions to actuate the fluidic device 15 dumping the fluid from the chambers 13 thereby deflating the chambers so that the pressure rollers 12 are moved out of position with the belt and thereby out of driving engagement with the article-carrying rollers 10.

Thus, as shown in FIG. 1, if the articles A are interrupted in their movement by means of an obstacle O, the restriction of fluid from the nozzle 16 actuates the fluidic switch 15 to lower the pressure rollers 12 as shown on the left.

An apparatus for utilizing the system which is shown diagrammatically in FIG. 1 is more specifically shown in FIGS. 2–5 wherein identical reference numerals are utilized for purposes of convenience. Article-carrying rollers 10 have their shafts 20 extending through slots 21 in the upper ends of side frame members 22. Construction of the rollers 10 is well known and includes bearings whereby the rollers are rotatably mounted on the shafts 20. The belt 11 extends beneath the rollers 10. Pressure rollers 12 have their shafts 23 extending through vertically elongated slots 24 in the walls of side frame members 22. L-shaped brackets 26 are mounted for vertical movement at longitudinally spaced points in frame member 22. Each bracket 26 is retained on side frame member 22 by an L-shaped fixed bracket 25 which includes a downwardly extending lip 25a on frame member 22 which confines the vertical wall 27 of the bracket 26. Bracket 26 also includes a horizontal portion 28 conforming generally with the horizontal portion 29 of bracket 25. A bladder 30 of flexible material forming a sealed chamber is interposed between the portions 28, 29 and has a fitment 31 extending downwardly through an opening 32 in the portion 28 to which a hose 33 or other fluid connection may be provided. As shown, a bladder 30 and associated structure is provided at each end of the pressure roller 12. It can be understood that a plurality of rollers 12 may be provided on the single bracket 25.

When under normal conditions, articles are not interrupted in their movement, air is supplied to the bladders 30 inflating them as shown in FIG. 5 to keep the pressure rollers 12 in contact with the belt and in turn the belt with the rollers 10. If, however, the nozzle 16 senses the presence of an article, interrupted in its movement, the flow out of nozzle 16 is restricted and the fluidic switch 15 is thereby operated to deflate the bladders 30 on each end of rollers 12 lowering the rollers 12 controlled by those bladders out of engagement with the belt 11.

As shown in FIG. 2, the nozzle and fluidic switch are assembled in a single unit on a crossbar 31 supported between the frame members 22.

One form of control system for the conveyor system may be of the type shown in FIG. 6. The sensor or nozzle 16 projects an inverted cone jet. The pressure under or inside the cone is constant. When an object intersects the cone, some of the air which creates the side of the cone is forced down toward the large or lower end of the inverted cone through the passage to produce a signal that is amplified by an amplifier 35. This operates the fluidic switch 15 which controls the bladder 30. A combined sensor, amplifier and switch are commercially available as, for example, the pneumatic proximity sensor-amplifier sold by The General Electric Company under the designation Model PS 11 BA.

Figure 7:
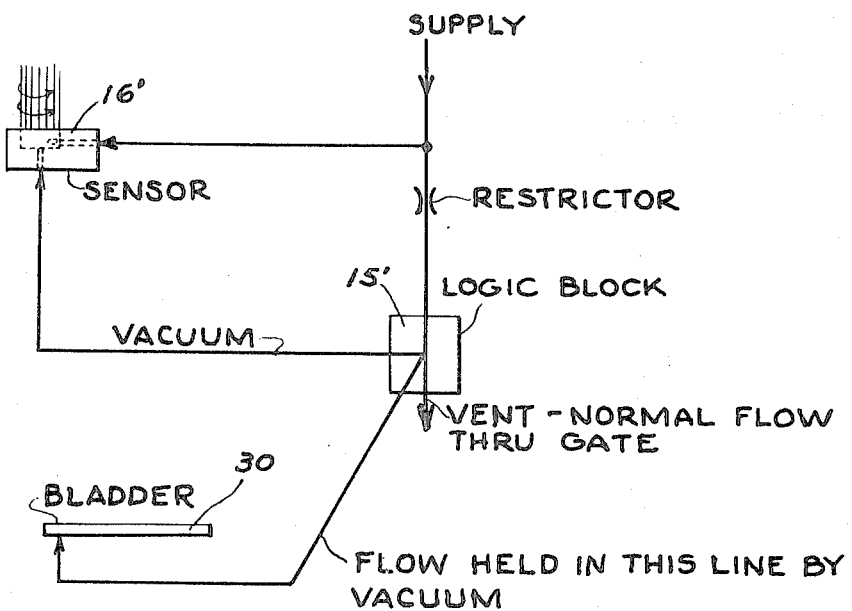
FIG. 7 is a schematic diagram of another type of control system.

Another type of control system is shown in FIG. 7 wherein the sensor 16' produces a vortex flow of air by directing air tangentially into a cylindrical chamber that has an open upper end. This creates a partial vacuum into the center of the chamber. An opening in the center of the chamber is connected to the vent of the gate or fluidic switch 15'. The vacuum in this line holds the flow through the gate 15' in the operation leg which inflates the bladder 30. If the flow from the sensor 16' is interrupted, the vacuum in the center is destroyed and the flow through the switch gate 15' reverts to its normal state and the bladder 30 vents. A combined sensor, amplifier and switch of the type shown in FIG. 7 are commercially available as, for example, is presently sold by Corning Glass Works, Corning, N.Y.

I claim:

1. In a conveyor, the combination comprising
   a plurality of longitudinally spaced transversely extending article-carrying rollers.

driving means beneath said rollers for engaging said rollers to rotate the rollers and thereby move articles supported by said rollers, expansible chamber means for moving said driving means into and out of driving engagement with said rollers, noncontacting sensing means in the path of the articles supported by said rollers, and means operable by said sensing means when an article is interrupted in its movement over said sensing means to actuate the expansible chamber means and thereby move said driving means away from said rollers, said noncontacting sensing means comprising a fluid nozzle directing fluid upwardly into the path of an article.

2. The combination set forth in claim 1 wherein said last-mentioned means operable by said sensing means comprises a fluidic switch operable upon obstruction of the flow from said nozzle to actuate said expansible chamber means.

3. The combination set forth in claim 1 wherein said expansible chamber means is normally operated by the application of fluid therein to hold said driving means in engagement with said article-carrying rollers and is operable upon actuation of the means operable by the sensing means to remove fluid therefrom and thereby permit the driving means to move away from said rollers.

4. The combination set forth in claim 1 wherein said expansible chamber means comprises a longitudinally extending elastic walled device which is inflatable and deflatable by application and removal of fluid therefrom.

5. The combination set forth in claim 4 wherein said driving means controlled by said expansible chamber means comprises an elastic walled element operable upon a plurality of article-carrying rollers at one time.

6. In a conveyor, the combination comprising a plurality of longitudinally spaced transversely extending article-carrying rollers, driving means beneath said rollers for engaging said rollers to rotate the rollers and thereby move articles supported by said rollers, expansible chamber means for moving said driving means into and out of driving engagement with said rollers, said expansible chamber means comprises a longitudinally extending elastic-walled device which is inflatable and deflatable by application and removal of fluid therefrom, noncontacting sensing means in the path of the articles supported by said rollers, and means operable by said sensing means when an article is interrupted in its movement over said sensing means to actuate the expansible chamber means and thereby move said driving means away from said rollers, said driving means comprising a belt beneath said article-carrying rollers and pressure rollers movable toward and away from said belt to hold said belt into and out of driving engagement with said article-carrying rollers, said noncontacting sensing means comprising a fluid nozzle directing fluid upwardly into the path of an article.

7. The combination set forth in claim 6 wherein said last-mentioned means operable by said sensing means comprises a fluidic switch operable upon obstruction of the flow from said nozzle to actuate said expansible chamber means.

8. The combination set forth in claim 6 wherein said expansible chamber means is operable on a plurality of pressure rollers.